United States Patent
Dearing et al.

(10) Patent No.: US 11,465,695 B2
(45) Date of Patent: Oct. 11, 2022

(54) VEHICLE TAILGATE ASSEMBLY

(71) Applicant: Nissan North America, Inc., Franklin, TN (US)

(72) Inventors: Scott Dearing, Walled Lake, MI (US); Scott Nydam, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 407 days.

(21) Appl. No.: 16/817,061

(22) Filed: Mar. 12, 2020

(65) Prior Publication Data
US 2021/0284251 A1    Sep. 16, 2021

(51) Int. Cl.
*B62D 33/027*    (2006.01)
*E05F 5/02*    (2006.01)
*E05D 3/02*    (2006.01)

(52) U.S. Cl.
CPC ........... *B62D 33/0273* (2013.01); *E05D 3/02* (2013.01); *E05F 5/022* (2013.01); *E05Y 2201/212* (2013.01); *E05Y 2900/546* (2013.01)

(58) Field of Classification Search
CPC .... B62D 33/0273; B62D 33/037; E05D 3/02; E05D 5/062; E05D 7/105; E05D 7/081; E05F 5/022; E05Y 2201/212; E05Y 2900/546; E05Y 2201/224; E05Y 2600/626; E05Y 2900/544
USPC ........................................................ 296/207
See application file for complete search history.

(56) References Cited

U.S. PATENT DOCUMENTS

| | | | |
|---|---|---|---|
| 6,318,795 B1 * | 11/2001 | Pyo | B60J 5/101 |
| | | | 296/76 |
| 6,349,989 B1 | 2/2002 | Kim | |
| 8,678,486 B2 | 3/2014 | Chaufour et al. | |
| 9,677,311 B2 * | 6/2017 | Shaw | E05F 1/1238 |
| 10,119,313 B2 * | 11/2018 | Higgins | E05D 11/0018 |
| 2005/0093342 A1 | 5/2005 | Kim | |
| 2008/0224494 A1 * | 9/2008 | Anderson | F16F 1/10 |
| | | | 296/57.1 |

FOREIGN PATENT DOCUMENTS

EP    2815151 B1    4/2016

OTHER PUBLICATIONS

Honda, Ridgeline, 2017 model year.
Dodge, Ram 1500, 2019 model year.
Ford, Ranger, 2019 model year.
Chevy, Colorado, 2015 model year.
Nissan, Frontier, 2016 model year.
Jeep, Gladiator, 2019 model year.

* cited by examiner

*Primary Examiner* — Pinel E Romain
(74) *Attorney, Agent, or Firm* — Global IP Counselors, LLP

(57) ABSTRACT

A vehicle tailgate assembly includes a vehicle body structure, a tailgate, a hinge assembly and a bumper. The vehicle body structure defines a tailgate opening and having a hinge support section. The tailgate is installed to the vehicle body structure for movement between an upright orientation and a horizontal orientation. The hinge assembly has a first portion installed to the hinge support section and a second portion installed to the tailgate. The bumper is installed to the vehicle body structure proximate the hinge support section such that with the tailgate in the upright orientation, the second portion of the hinge assembly contacts the bumper.

17 Claims, 7 Drawing Sheets

VEHICLE TAILGATE ASSEMBLY

BACKGROUND

Field of the Invention

The present invention generally relates to a vehicle tailgate assembly. More specifically, the present invention relates to a vehicle tailgate assembly with a hinge assembly that has a bumper that reduces vibration related noises when a tailgate is in a closed orientation.

Background Information

Pickup trucks typically include a tailgate movable between a closed orientation closing a rear portion of a cargo bed and an open or horizontal orientation exposing the rear portion of the cargo bed. With the tailgate in the closed orientation, the tailgate often rattles when traveling over rough or uneven surfaces.

SUMMARY

One object of the present disclosure is to provide a vehicle tailgate assembly with a bumper that cushions a tailgate with the tailgate in a closed orientation to reduce and/or eliminate vibration related noises.

In view of the state of the known technology, one aspect of the present disclosure is to provide a vehicle tailgate assembly with a vehicle body structure, a tailgate, a hinge assembly and a bumper. The vehicle body structure defines a tailgate opening and having a hinge support section. The tailgate is installed to the vehicle body structure for movement between an upright orientation and a horizontal orientation. The hinge assembly has a first portion installed to the hinge support section and a second portion installed to the tailgate. The bumper is installed to the vehicle body structure proximate the hinge support section such that with the tailgate in the upright orientation, the second portion of the hinge assembly contacts the bumper.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
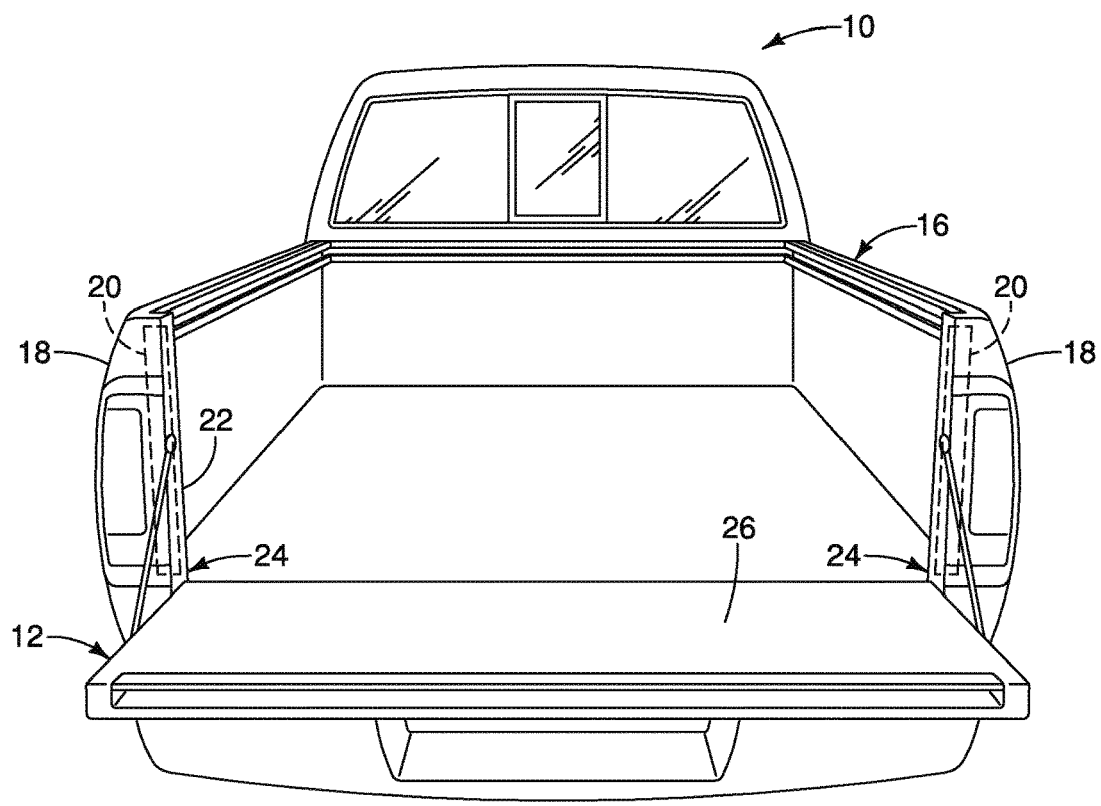
FIG. 1 is a rear view of a vehicle showing a cargo area with side walls with struts structures and a tailgate assembly in accordance with a first embodiment.
Figure 2:
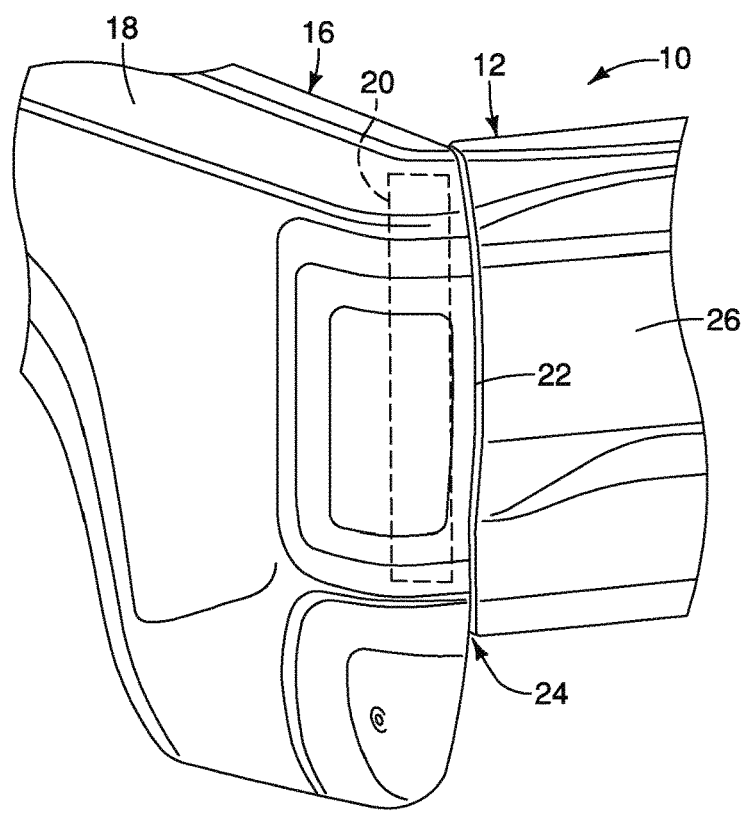
FIG. 2 is a perspective view of a rear corner of the cargo area of the vehicle depicted in FIG. 1 showing a rear corner of a side wall of the cargo area and the tailgate assembly in accordance with the first embodiment.
Figure 3:
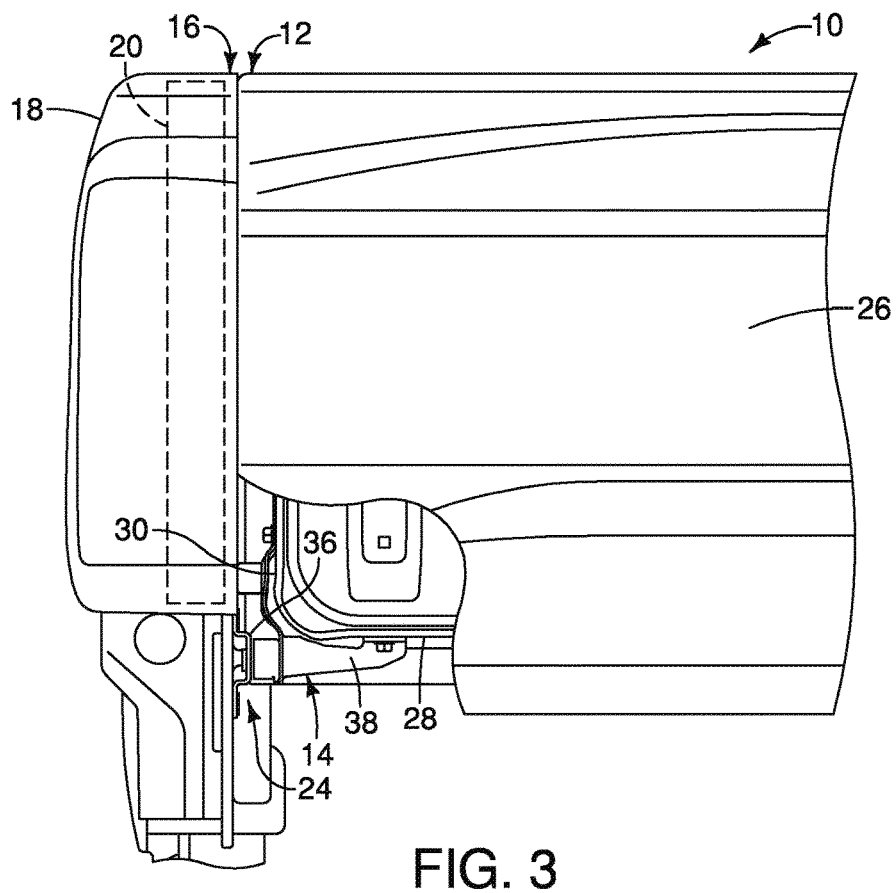
FIG. 3 is a rear view and part cutaway of the rear corner of the cargo area depicted in FIGS. 1 and 2 showing a hinge assembly of the tailgate assembly in accordance with the first embodiment.
Figure 4:
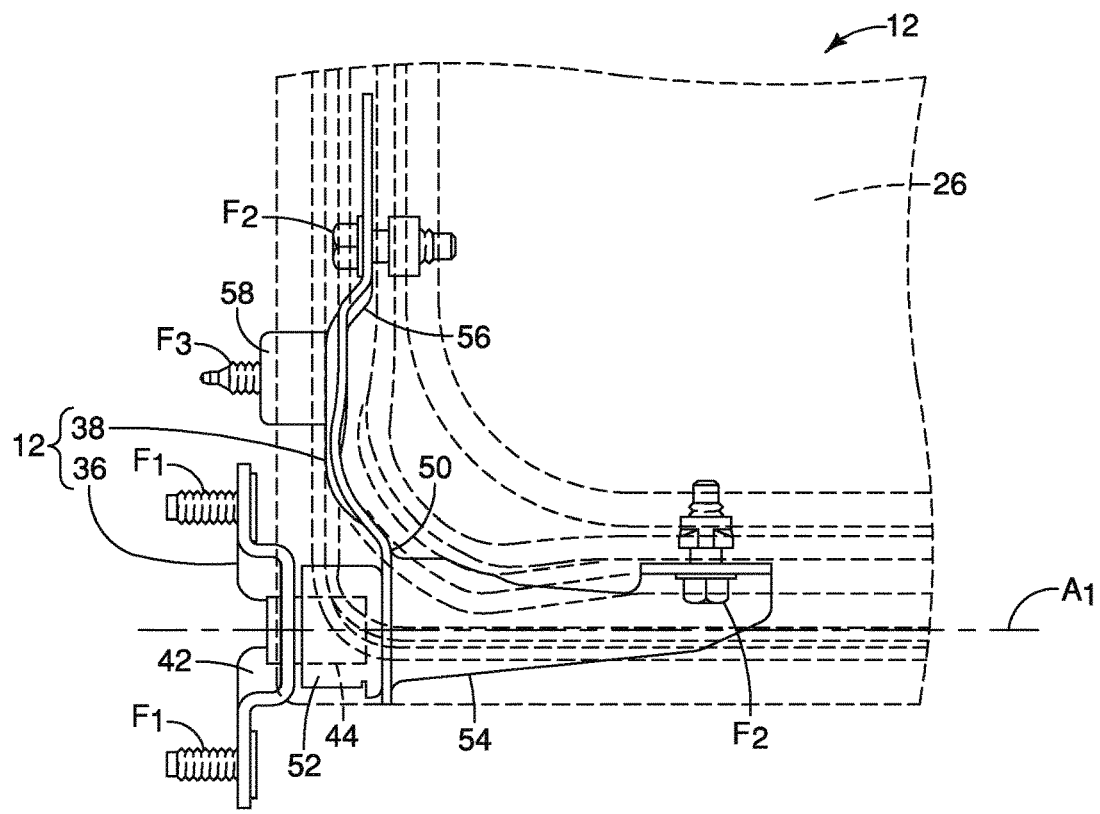
FIG. 4 is another rear view of the rear corner of the cargo assembly showing further detail of the hinge assembly and tailgate in accordance with the first embodiment.
Figure 5:
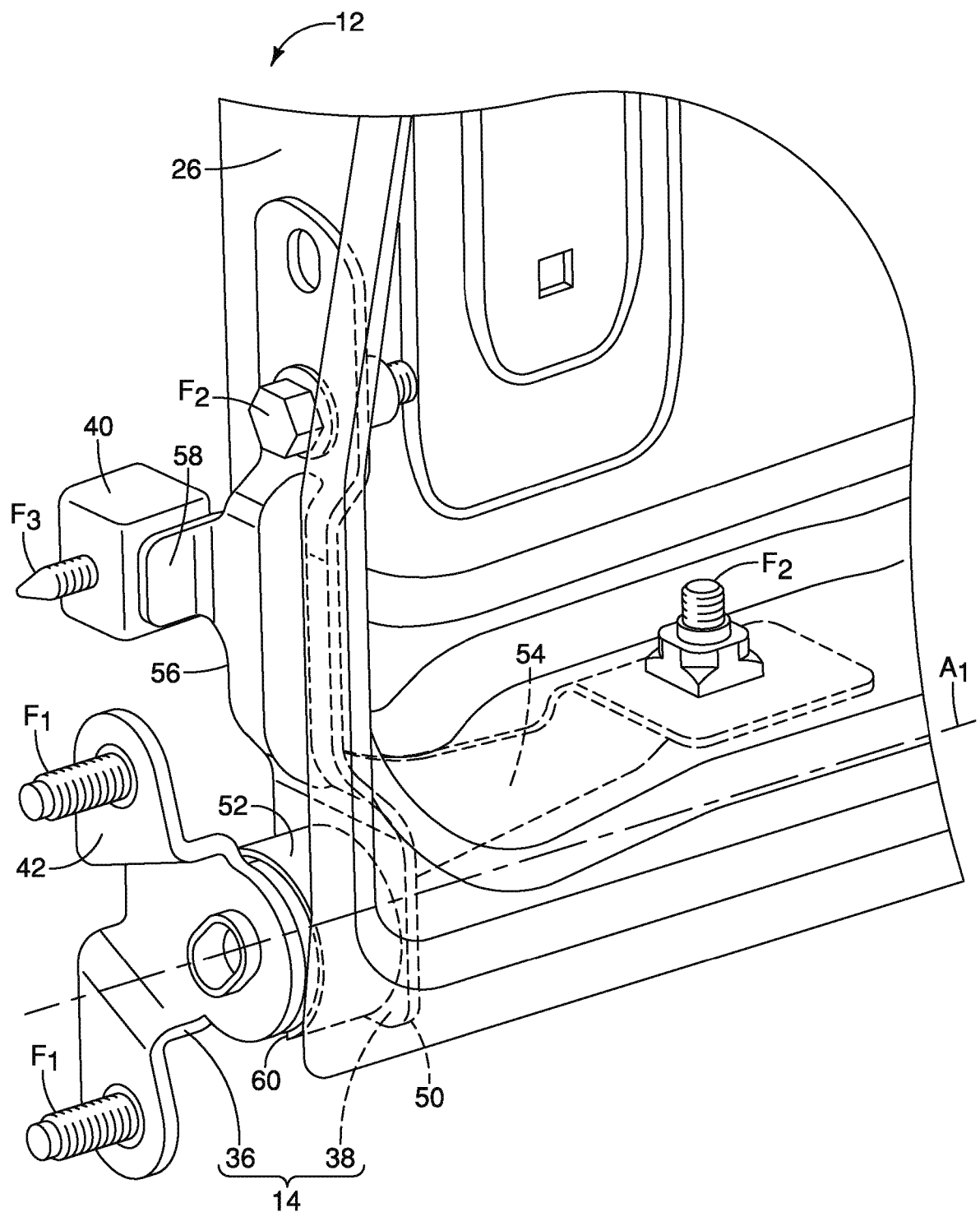
FIG. 5 is a perspective exploded view of the tailgate removed from the vehicle showing a first portion and a second portion of the hinge assembly with the second portion attached to the tailgate in accordance with the first embodiment.

Referring initially to FIGS. 1 and 2, a vehicle 10 that includes a tailgate assembly 12 that includes hinge assemblies 14 (one of the hinge assemblies 14 is shown in FIGS. 3 and 4) is illustrated in accordance with a first embodiment.

The vehicle 10 depicted in the drawings is a pickup truck with a cargo area 16 (also referred to as a vehicle body structure 16 and a pickup truck cargo bed 16). The cargo area 16 is defined by side walls 18 that include pillar or strut structures 20 (FIGS. 1-3) located at a rearward end of each of the side walls 18. A tailgate opening 22 is defined between the strut structures 20. Respective lower ends of the strut structures 20 define hinge support sections 24.

The tailgate assembly 12 includes a tailgate 26 that is installed between the strut structures 20 for movement between a closed orientation (an upright orientation, shown in FIGS. 2 and 3) closing or covering the tailgate opening 22 and an open orientation (a lowered or horizontal orientation, shown in FIG. 1) exposing the tailgate opening 22 and cargo space within the cargo area 16.

The tailgate 26 is supported by a pair of the hinge assemblies 14. The hinge assemblies 14 are identical to one another, except that they are symmetrical mirror images of one another. Consequently, only one hinge assembly 14 is shown and described herein below for the sake of brevity. However, it should be understood from the drawings and the description herein that the description of one hinge assembly 14 applies equally to both of the hinge assemblies 14.

As shown in FIGS. 3 and 4, the tailgate 26 includes a lower surface 28 and a side surface 30.

As shown in FIGS. 3-5 and 8-10, the hinge assembly 14 has a first portion 36, a second portion 38 and a bumper 40. The first portion 36 includes a base portion 42 and a shaft portion 44. The base portion 42 of the first portion 36 is a metal plate shaped for attachment to the strut structure 20. More specifically, the base portion 42 of the first portion 36 of the hinge assembly 14 is rigidly and non-movably fixed to the hinge support section 24 of the strut structure 20 by mechanical fasteners $F_1$. The shaft portion 44 is welded or otherwise rigidly fixed to the base portion 42 of the first portion 36 and defines a pivot axis $A_1$ about which the tailgate 26 pivots when moving between the closed orientation and the open orientation. As shown in FIG. 4, the shaft portion 44 extends in an inboard direction from the base portion 42 when installed to the strut structure 20.

As shown in FIGS. 4-5 and 7-12, the second portion 38 includes a base portion 50 and an annular ring 52. The base portion 50 further includes a first leg 54 and a second leg 56. The first leg 54 and the second leg 56 are made of a single metal plate that is bent such that the first leg 54 and the second leg 56 are perpendicular to one another. Alternatively, the first leg 54 and the second leg 56 can be separate metal plates rigidly welded to one another. The first leg 54 of the base portion 50 is fixedly attached to the lower surface 28 of the tailgate 26 by a mechanical fastener $F_2$. The second leg 56 is fixedly attached to the side surface 30 of the tailgate 26 by another fastener $F_2$. Hence, the second portion 38 of the hinge assembly 14 is installed to the tailgate 26. The annular ring 52 is welded or otherwise rigidly fixed to the second leg 56 and extends in an outboard direction with the hinge assembly 14 attached to the tailgate 26.

The second leg 56 of the second portion 38 of the hinge assembly 14 includes projection 58. The projection 58 extends in the outboard direction from the second leg 56 of the second portion 38 and is located above the annular ring 52 with the tailgate 26 in the closed orientation. The projection 58 has a surface 58a that contacts the bumper 40 with the tailgate 26 in the closed upright orientation, as is described further below.

Figure 7:
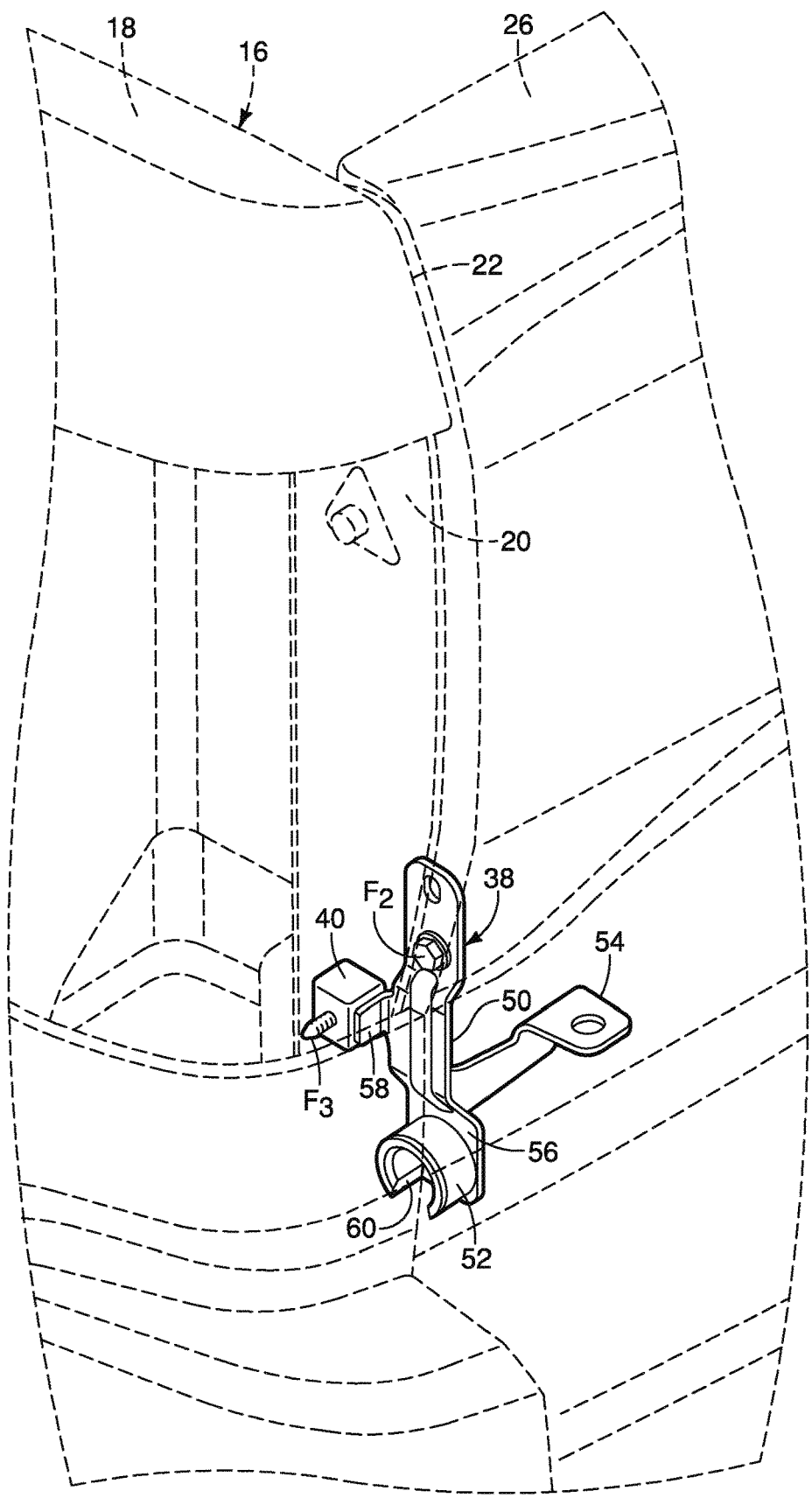
FIG. 7 is a perspective view of the second portion of the hinge assembly with the tailgate and side wall shown in phantom in accordance with the first embodiment.
Figure 8:
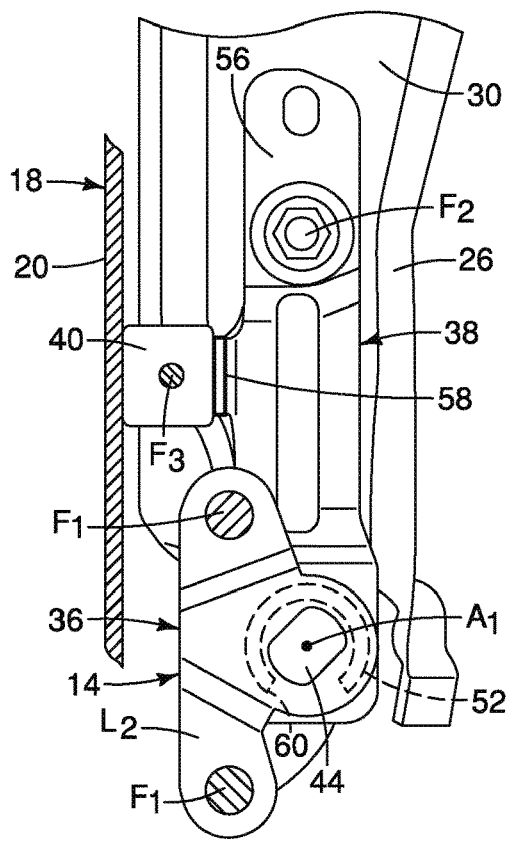
FIG. 8 is a part cross-sectional side view looking in an inboard direction of the tailgate in an upright orientation showing a portion of the side wall with a bumper installed thereto and further showing a projection of the second portion of the hinge assembly contacting the bumper in accordance with the first embodiment.
Figure 9:
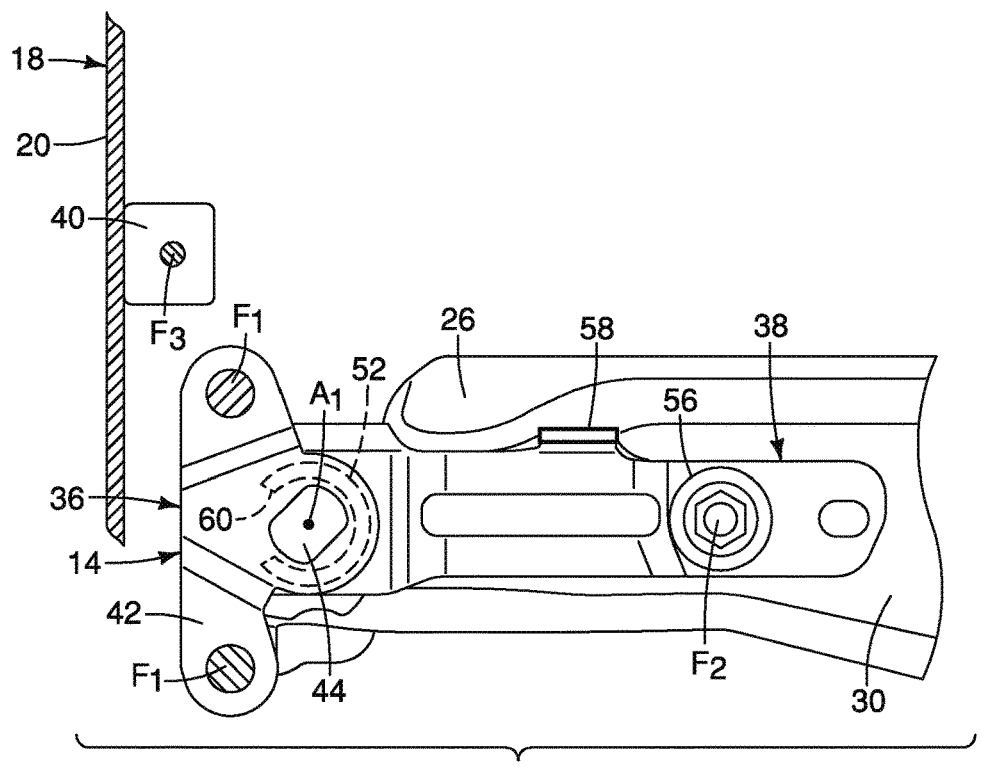
FIG. 9 is another cross-sectional side view similar to FIG. 8 of the tailgate in a horizontal orientation showing the portion of the side wall with the bumper installed thereto and with the projection of the second portion of the hinged pivoted away from the bumper in accordance with the first embodiment.
Figure 10:
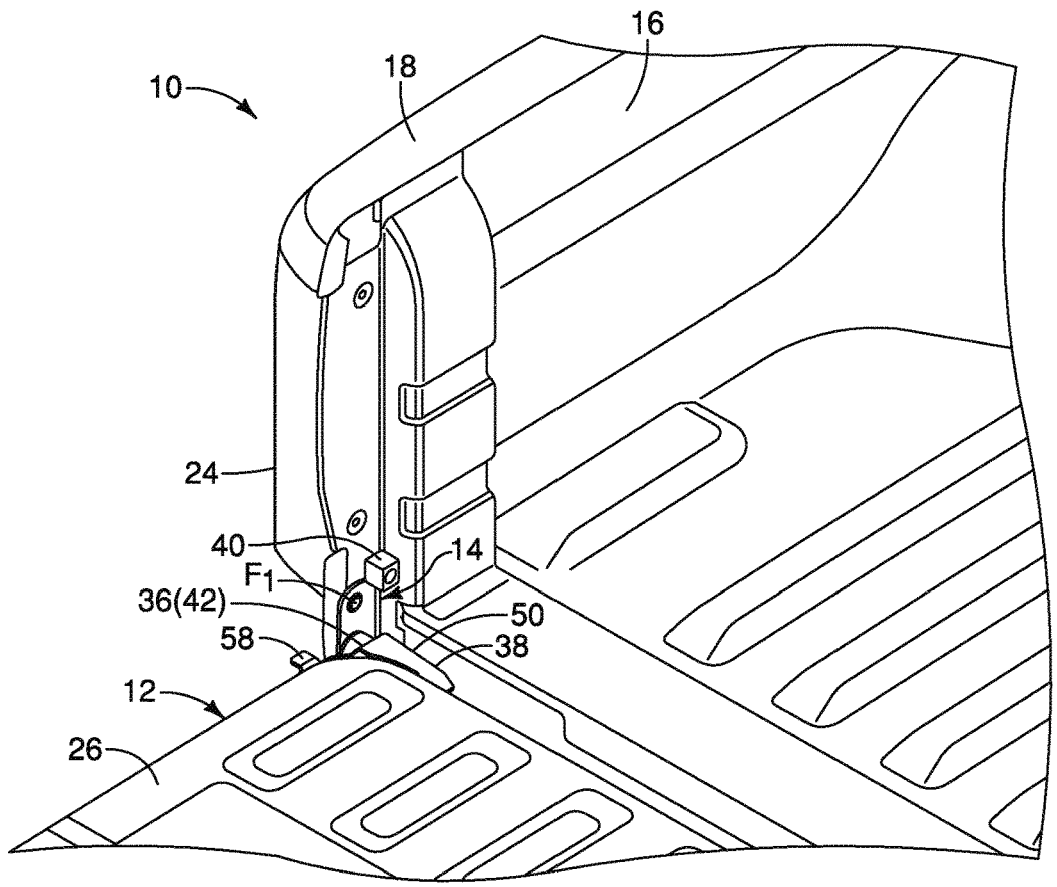
FIG. 10 is a perspective view of the rear corner of the cargo area with the tailgate in the horizontal orientation showing the first and second portions of the hinge assembly engaged with one another in accordance with the first embodiment.
Figure 11:
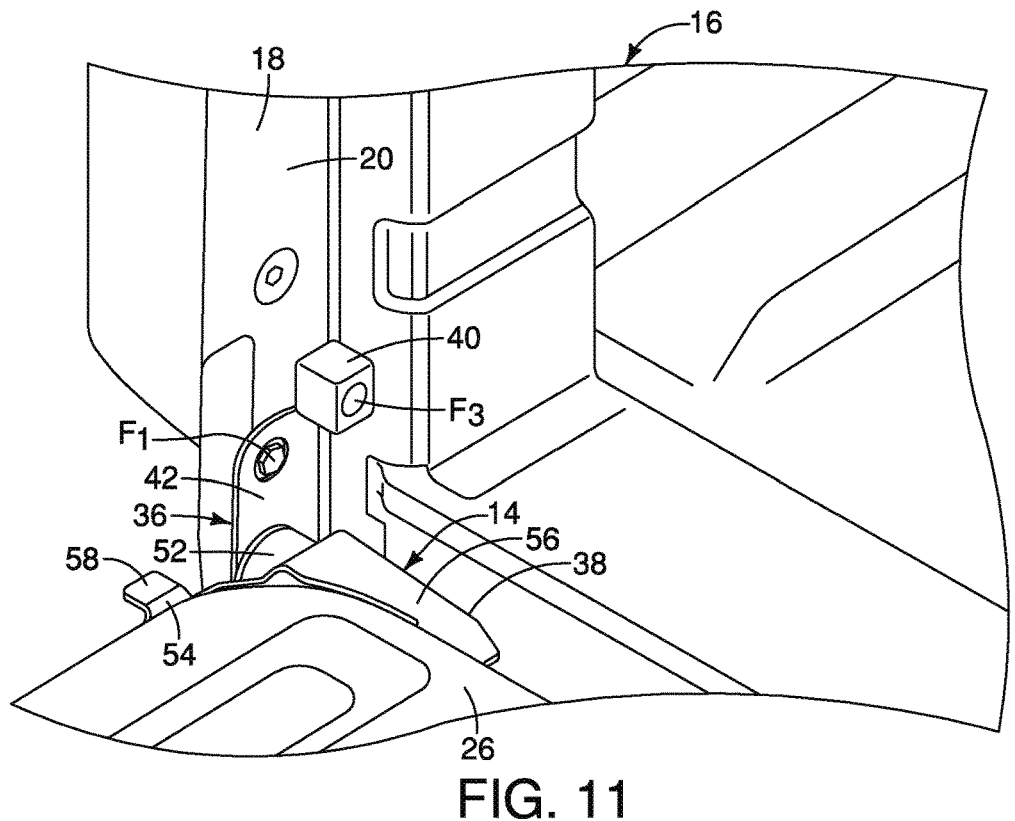
FIG. 11 is a further perspective view of the rear corner of the cargo area with the tailgate in the horizontal orientation showing the first and second portions of the hinge assembly and the bumper in accordance with the first embodiment.

The annular ring 52 of the second portion 38 of the hinge assembly 14 is dimensioned to fit around the shaft portion 44 of the first portion 36 of the hinge assembly 14 with the tailgate 26 installed to the vehicle 10. As shown in FIG. 7-9, the annular ring 52 has a gap 60 at a lower area thereof (with the tailgate 26 in the closed or upright orientation) such that the tailgate 26 and the second portion 38 of the hinge assembly 14 are removable from the vehicle body structure 16 and first portion 36 of the hinge assembly 14. More specifically, the tailgate 26 and second portion 38 can be lifted upward such that the shaft portion 44 (remaining stationary on the strut structure 20) passes through the gap 60 as the tailgate 26 and second portion 38 of the hinge assembly 14 move upward and away from the first portion 36 of the hinge assembly 14 and the strut structure 20.

Figure 6:
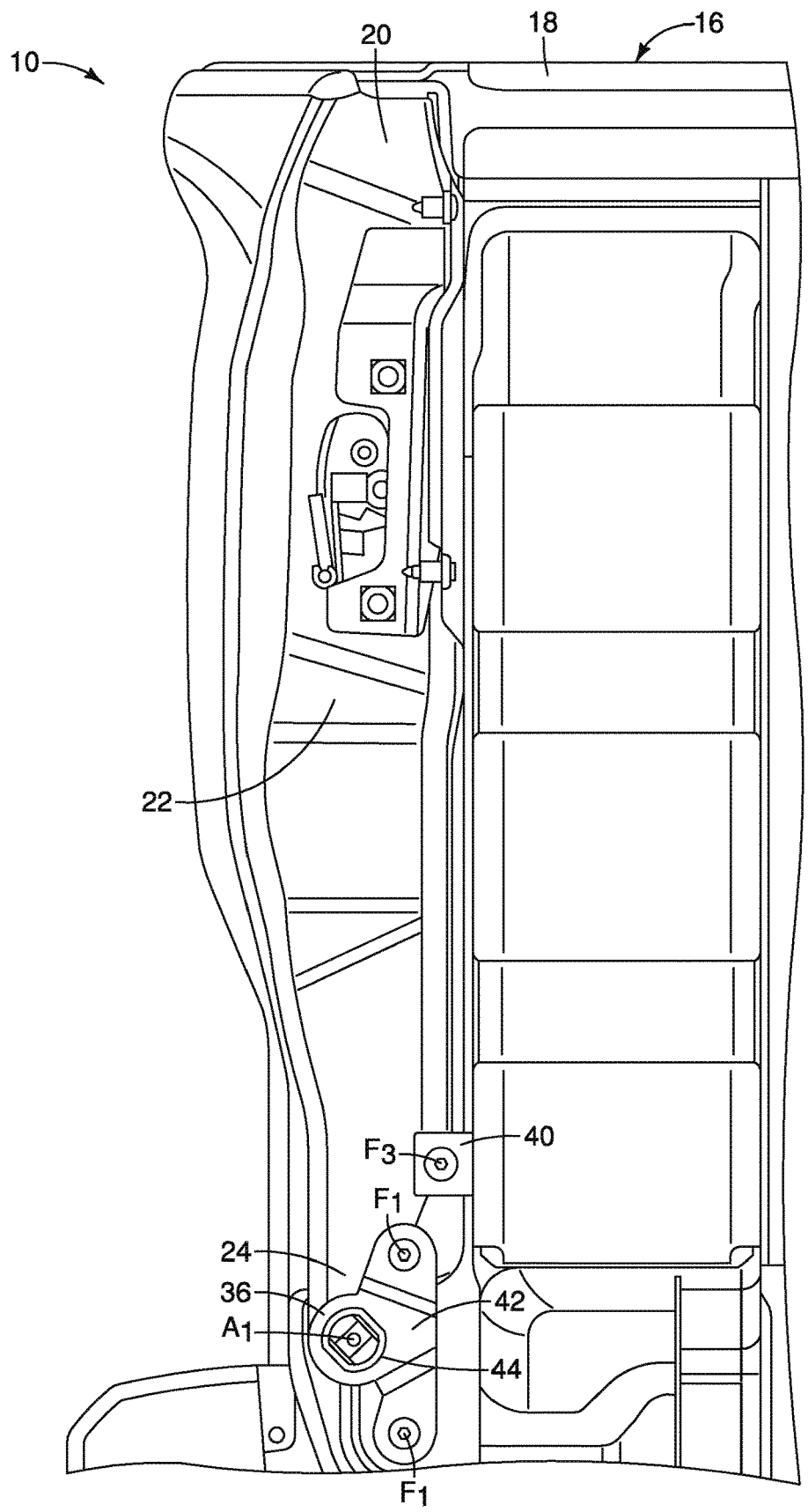
FIG. 6 is a side view of an inboard side of the side wall of the cargo area with the tailgate removed showing the first portion of the hinge assembly installed to the side wall in accordance with the first embodiment.

The bumper 40 is made of a compressible and resilient material, such a rubber or a rubber-like material. As shown in FIGS. 6-7, the bumper 40 installed to the strut structure 20 of the vehicle body structure 16 proximate the hinge support section 24 above the first portion 36 of the hinge assembly 14. The bumper 40 is fixed to the strut structure 20 by a mechanical fastener $F_3$ and is positioned such that when the tailgate 26 is moved to the upright orientation, the surface 58a of the projection 58 the second portion 38 of the hinge assembly 14 contacts and slightly compresses the bumper 40. More specifically, the bumper 40 is compressed between the strut structure 20 and the projection 58 of the second portion 38 of the hinge assembly 14 in with the tailgate 26 in the closed or upright orientation.

The unique location of the bumper 40 provides a cushioning effect for closing movements of the tailgate 26 and also reduces and/or eliminates rattling noises that might otherwise be caused by vibration related movement of the tailgate 26 when locked in the closed or upright orientation.

The various features and structures of the vehicle 10 (other than the vehicle tailgate assembly 12) are conventional components that are well known in the art. Since such features and structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle tailgate assembly 12. Accordingly, these terms, as utilized to describe the present invention should be interpreted relative to a vehicle equipped with the vehicle tailgate assembly 12.

The terms of degree such as "substantially". "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:
1. A vehicle tailgate assembly, comprising:
a vehicle body structure defining a tailgate opening and having a hinge support section;

a tailgate installed to the vehicle body structure for movement between an upright orientation and a horizontal orientation;

a hinge assembly having a first portion installed to the hinge support section, a second portion installed to the tailgate, and a bumper installed to the vehicle body structure proximate the hinge support section such that with the tailgate in the upright orientation, the second portion of the hinge assembly contacts the bumper.

2. The vehicle tailgate assembly according to claim 1, wherein the second portion of the hinge assembly includes projection having a surface that contacts the bumper with the tailgate in the upright orientation.

3. The vehicle tailgate assembly according to claim 2, wherein the bumper is made with a compressible and resilient material.

4. The vehicle tailgate assembly according to claim 3, wherein the bumper is compressed between the vehicle body structure and the projection of the second portion of the hinge assembly in with the tailgate in the upright orientation.

5. The vehicle tailgate assembly according to claim 1, wherein the vehicle body structure includes a strut structure that defines one side of the tailgate opening, the hinge support section being defined on the strut structure.

6. The vehicle tailgate assembly according to claim 5, wherein the first portion of the hinge assembly is rigidly and non-movably fixed to the hinge support section of the strut structure.

7. The vehicle tailgate assembly according to claim 5, wherein the bumper is attached to the strut structure above and adjacent to the hinge support section of the vehicle body structure.

8. The vehicle tailgate assembly according to claim 1, wherein the tailgate includes a lower surface and a side surface, and the second portion of the hinge assembly includes a first leg attached to the lower surface of the tailgate and a second leg attached to the side surface of the tailgate.

9. The vehicle tailgate assembly according to claim 8, wherein the first portion of the hinge assembly includes a shaft portion, and the second portion of the hinge includes an annular ring dimensioned to fit around the shaft portion, the annular ring having a gap at a lower area thereof such that the tailgate and the second portion of the hinge assembly are removable from the vehicle body structure and first portion of the hinge assembly.

10. The vehicle tailgate assembly according to claim 1, wherein the first portion of the hinge assembly includes a shaft portion, and the second portion of the hinge assembly includes an annular ring dimensioned to fit around the shaft portion, the annular ring having a gap at a lower area thereof such that the tailgate and the second portion of the hinge assembly are removable from the vehicle body structure and first portion of the hinge.

11. The vehicle tailgate assembly according to claim 1, wherein the vehicle body structure defines a pickup truck cargo bed with the tailgate opening being defined at a rearward end of the pickup truck cargo bed.

12. A vehicle tailgate assembly, comprising:

a pickup truck cargo bed having a strut structure that at least partially defines a tailgate opening, the strut structure having a hinge support section;

a tailgate installed to the pickup truck cargo bed for movement between an upright orientation covering the tailgate opening and a horizontal orientation exposing rear area a cargo area of the pickup truck cargo bed;

a hinge assembly having a first portion installed to the hinge support section, a second portion installed to the tailgate, and a compressible bumper installed to the strut structure proximate the hinge support section such that with the tailgate in the upright orientation, the second portion of the hinge assembly contacts the compressible bumper.

13. The vehicle tailgate assembly according to claim 12, wherein the second portion of the hinge assembly includes projection that has surface that contacts the compressible bumper with the tailgate in the upright orientation such that the bumper is compressed between a portion of strut structure of the pickup truck cargo bed and the projection of the second portion of the hinge assembly in with the tailgate in the upright orientation.

14. The vehicle tailgate assembly according to claim 12, wherein the first portion of the hinge assembly is rigidly and non-movably fixed to the hinge support section of the strut structure.

15. The vehicle tailgate assembly according to claim 14, wherein the bumper is attached to the strut structure above and adjacent to the hinge support section of the vehicle body structure.

16. The vehicle tailgate assembly according to claim 12, wherein the tailgate includes a lower surface and a side surface, and the second portion of the hinge assembly includes a first leg attached to the lower surface of the tailgate and a second leg attached to the side surface of the tailgate.

17. The vehicle tailgate assembly according to claim 12, wherein the first portion of the hinge assembly includes a shaft portion, and the second portion of the hinge assembly includes an annular ring dimensioned to fit around the shaft portion, the annular ring having a gap at a lower area thereof such that the tailgate and the second portion of the hinge assembly are removable from the vehicle body structure and first portion of the hinge.

* * * * *